United States Patent [19]

Mitsui et al.

[11] Patent Number: 5,689,665
[45] Date of Patent: Nov. 18, 1997

[54] APPARATUS AND METHOD FOR DISPLAYING WINDOWS

[75] Inventors: Kinichi Mitsui, Asaka, Japan; Shahram Javey, Toronto, Canada

[73] Assignee: International Business Machines Corporation, Armonk, N.Y.

[21] Appl. No.: 483,907

[22] Filed: Jun. 7, 1995

Related U.S. Application Data

[63] Continuation of Ser. No. 031,383, Dec. 17, 1992, abandoned.

[30] Foreign Application Priority Data

Feb. 28, 1992 [JP] Japan .................... 4-043276

[51] Int. Cl.$^6$ .................................................. G06F 3/14
[52] U.S. Cl. ................................. 395/342; 395/333
[58] Field of Search ................... 395/155, 156, 395/157, 158, 159, 160, 161, 146, 147, 342, 334, 333; 345/119, 120

[56] References Cited

U.S. PATENT DOCUMENTS

| | | | |
|---|---|---|---|
| 4,815,029 | 3/1989 | Barker et al. | 395/778 |
| 4,962,475 | 10/1990 | Hernandez et al. | 395/777 |
| 5,060,170 | 10/1991 | Bourgeois et al. | 395/342 |
| 5,191,644 | 3/1993 | Takeda | 395/344 |
| 5,261,042 | 11/1993 | Brandt | 395/333 |
| 5,287,514 | 2/1994 | Gram | 395/333 |
| 5,297,250 | 3/1994 | Leroy et al. | 395/333 |
| 5,307,086 | 4/1994 | Griffin et al. | 345/146 |
| 5,335,320 | 8/1994 | Iwata et al. | 395/704 |
| 5,339,392 | 8/1994 | Risberg et al. | 395/333 |
| 5,412,774 | 5/1995 | Agrawal et al. | 395/157 |
| 5,592,603 | 1/1997 | Arato et al. | 395/334 |

*Primary Examiner*—Raymond J. Bayerl
*Assistant Examiner*—Crescelle N. dela Torre
*Attorney, Agent, or Firm*—Jeffrey S. LaBaw

[57] ABSTRACT

A layout table describing positions and types of a plurality of windows is used to manage a graphical user interface. At the time of initialization or when the layout table is changed, windows and associated window managing modules are generated or added in accordance with the contents of the layout table. The window managing module processes a user input event in accordance with its type and position, and displays appropriate information in the windows in accordance with the user's instructions. The user can describe the contents of the layout table in an external file or can specify layout information using a menu provided by the system when running the system. In this manner, the user can set the positions and types of windows as desired and improved ease of use can thus be enjoyed.

20 Claims, 9 Drawing Sheets

INTERNAL CONFIGURATION OF BROWSER

FIG. 1 EXAMPLE OF BROWSER SCREEN

CONFIGURATION OF WHOLE SYSTEM

INTERNAL CONFIGURATION OF BROWSER

| POSITION | TYPE | CURRENT STATUS |
|---|---|---|
| UPPER-LEFT | LIST | INITIAL SETTING |
| LOWER-LEFT | LIST | SPECIFICATION OF SPECIFIC FUNCTION |
| UPPER-RIGHT | GRAPH | INITIAL SETTING |
| LOWER-RIGHT | TEXT | INITIAL SETTING |

LAYOUT TABLE

FIG. 4

| TYPE | STATUS | MENU DEFINITION |
|---|---|---|
| LIST | INITIAL SETTING | LIST MENU 1 |
| LIST | SPECIFICATION OF SPECIFIC FUNCTION | LIST MENU 2 |
| ⋮ | ⋮ | ⋮ |
| GRAPH | INITIAL SETTING | GRAPH MENU 1 |
| ⋮ | ⋮ | ⋮ |
| TEXT | INITIAL SETTING | TEXT MENU 1 |
| ⋮ | ⋮ | ⋮ |

MENU TABLE

FIG. 5

INITIAL SETTING MENU

MENU FOR SPECIFICATION OF SPECIFIC FUNCTION

EXAMPLE OF BROWSER WINDOW

EXAMPLE OF BROWSER WINDOW

OPERATION OF LAYOUT MANAGING MODULE WHEN STARTING SYSTEM

OPERATION OF LAYOUT MANAGING MODULE IN RESPONSE TO LAYOUT CHANGE REQUEST AT THE TIME OF EXECUTION

EXAMPLE OF OPERATION OF SUB-WINDOW MANAGING MODULE IN RESPONSE TO INPUT EVENT

APPARATUS AND METHOD FOR DISPLAYING WINDOWS

This is a continuation of application Ser. No. 08/031,383 filed Dec. 17, 1992 now abandoned.

BACKGROUND OF THE INVENTION

The present invention relates to an apparatus and method for displaying a plurality of windows on a display screen or in a parent window. More particularly, it relates to a technique capable of individually setting a user interface for each of a plurality of windows.

It is a very effective method of displaying a system of information to arrange a plurality of windows (hereinafter called "sub-windows" to clarify that they are "windows in a window") in one window and display related information in the respective windows at the same time. This technique is widely employed in many systems. Window arrangement methods are classified into two categories. In methods of a first category, a theoretically infinite number of sub-windows that possibly overlap each other can be generated. This type of method can improve not only the function but the flexibility of a system. However, such methods have disadvantages in that a window arrangement is likely to become intricate and that many operations are required to rearrange the screen. For example, many operations will be required to view a portion of a sub-window that is covered by another sub-window. On the other hand, in methods of a second category, a fixed number of sub-windows are arranged, for example, four, so as not to overlap with each other. Although not having high flexibility, these types of methods are advantageous when performing relatively standardized operations and if it is not necessary to view a large quantity of information simultaneously. In such methods, only a small number of operations are required and a simpler screen is displayed.

The second category includes browsers of language processors. For example, a browser stated in chapter 4 "Source code browser" of the Reference Manual of "Objectwork/C++", Release 2 published by Fuji Xerox Information System Co., Ltd.

In conventional window systems belonging to the second category, user interfaces are established for each sub-window in a fixed manner. That is, the user interfaces are different for each type to be displayed such as a list, table, graph, text, or chart, parts to be used such as a button or menu are different, and the contents of the button or menu are also different. Further, in the conventional window systems of this category, the type of information to be displayed and, accordingly, the interface are fixed for each sub-window. For example, two sub-windows are arranged side by side, the left one is fixed to the type for list information, while the right is fixed to the type for text information. In another example, four sub-windows are arranged up-down and left-right, the left two of which are fixed to the type for list information, the upper right one is fixed to the type for graph information, and the lower right one is fixed to the type for text information. Fixing the type of information displayed within each sub-window in the above manner has such disadvantages as inconvenience in use and loss of a display space.

In other words, even in using the same information system, the required types of sub-windows and the number of each type will depend on the intended purpose of a user. Where two sub-windows are used, in one case it may be most appropriate to make both sub-windows the type for list, and in an other case it may be most appropriate both sub-windows the type for text. Where two sub-windows, one for list and another for text are arranged side by side, there is a further option to be made between the two arrangements: the text type on the right side and the list type on the left side, and the list type on the right side and the text type on the left side. It may be proper in some cases that this option be selected in accordance with the intended purpose of use. Therefore, it is understood that fixing the type of each sub-window as in the conventional methods causes some restrictions on the ease of operation.

Although it may be conceivable to prepare all types of sub-windows sufficiently to accommodate all possible cases, this will leave many sub-windows unused, reducing the efficiency of space utilization.

Further, since the menu of each sub-window is usually fixed, in some cases menu items not originally necessary for a user will be displayed. This is not a serious problem if the number of menu items is small. However, in window systems of the second category which employ a fixed number of sub-windows, because one sub-window is required to display a wide variety of information, this unavoidably increases the number of menu items. For example, in the case of selecting one element from a list displayed in a certain sub-window and displaying detailed information of the selected element in another sub-window, the number of specific menu items will necessarily increase because it will frequently happen that the two sub-windows are associated with different processes and different types to be displayed such as a list or a graph. If an attempt is made to accommodate such menu items by a common menu, the items and arrangement (i.e., hierarchy of pull-down and pop-up) will become complex. As a result, there will arise problems of a complicated menu view and redundant menu selecting operations.

The following prior art references disclose techniques related to the present invention.

A technique of changing a position, size, color, contents, etc. of a window after it is displayed is disclosed in "Operator Interface for the Creation and Control of Windows," IBM Technical Disclosure Bulletin, Vol. 32, No. 6B, pp. 219-223, November 1989. However, according to the technique disclosed in this reference, a certain command is stored in advance, and the attributes of a window are thereafter changed by executing that command. The manner of changing the attributes of the window is predetermined before displaying the window. This reference does not disclose a technique of freely changing during operation of a system the various graphical user interfaces that are prepared in accordance with types of a plurality of windows, such as a list, graph, and text.

Published Unexamined Patent Application No. 62-72059 discloses a technique in which in editing a composite object document an editing operation menu is automatically changed in accordance with a type selected for the editing. Further, a technique of changing a menu view in accordance with information to be displayed is disclosed in "User Interface for Dynamic Change of Action Bar and Pulldown Content Based upon Attributes of Selected Objects," Research Disclosure of Kenneth Mason Publication Ltd. (Britain), No. 307, November 1989. However, neither of the publications disclose a technique in which when using a plurality of windows, a menu view is automatically changed when detailed information on an element specified in one window is displayed in another window.

SUMMARY OF THE INVENTION

It is therefore an object of the invention to provide a user-friendly window displaying technique in which a user can freely set types and positions of sub-windows or windows.

It is another object of the invention to provide a window displaying technique in which a menu to be displayed is selected depending on the situation even where both the normal display and the display of detailed information on an item selected in another window is performed in a sub-window, so that a menu view can be simplified and a menu selecting operation can be performed easily.

It is another object of the invention to provide a user-friendly window display technique in which a user can freely set types and positions of a plurality of windows to be displayed on a display screen or in a parent window in an individual manner.

According to the invention, to attain the above objects, a table (layout table) describing positions and types of sub-windows is provided. At the time of initialization or when the layout table is changed, sub-windows and associated sub-window managing modules are generated or added in accordance with the contents of the layout table. The sub-window managing module processes a user input event in accordance with its type and position, and displays appropriate information in the sub-window in accordance with the user's instructions. The user can describe the contents of the layout table in an external file, or can specify layout information using a menu provided by the system when running the system. The type of sub-window can be selected, for example, from a list, graph, table, chart, text, etc., which are prepared in the system in advance. In this manner, the user can set the positions and types of sub-windows as desired and, therefore, he can enjoy improved ease of operations.

Further, according to the invention, the above layout table is arranged to store information on a current status, e.g., normal status or import status of each sub-window. In addition to the layout table, a table, the menu table, for correlating the status of each sub-window with a menu to be prepared for that status is provided. When it is required to do so, the system automatically changes the item for the current status in the layout table. When the item for the current status in the layout table is changed, the sub-window managing module fetches menu information for the new status from the menu table, and changes over the menu of the sub-window. In this manner, an individual menu is selected and displayed for the normal status and in the import status. As a result, the menu view can be simplified and the menu selecting operation becomes easier. In the following, an operation of selecting one item from an item list displayed in one sub-window and displaying detailed information on the selected item in another sub-window is called an "import" operation.

BRIEF DESCRIPTION OF THE DRAWINGS

FIG. 4 is a view showing an example of a layout table 12 shown in FIG. 3;

FIG. 5 is a view showing an example of a menu table 13 shown in FIG. 3;

DETAILED DESCRIPTION OF THE DRAWINGS

An embodiment in which the present invention is applied to a source code browser of a language processor will be explained with reference to the drawings.

Figure 1:
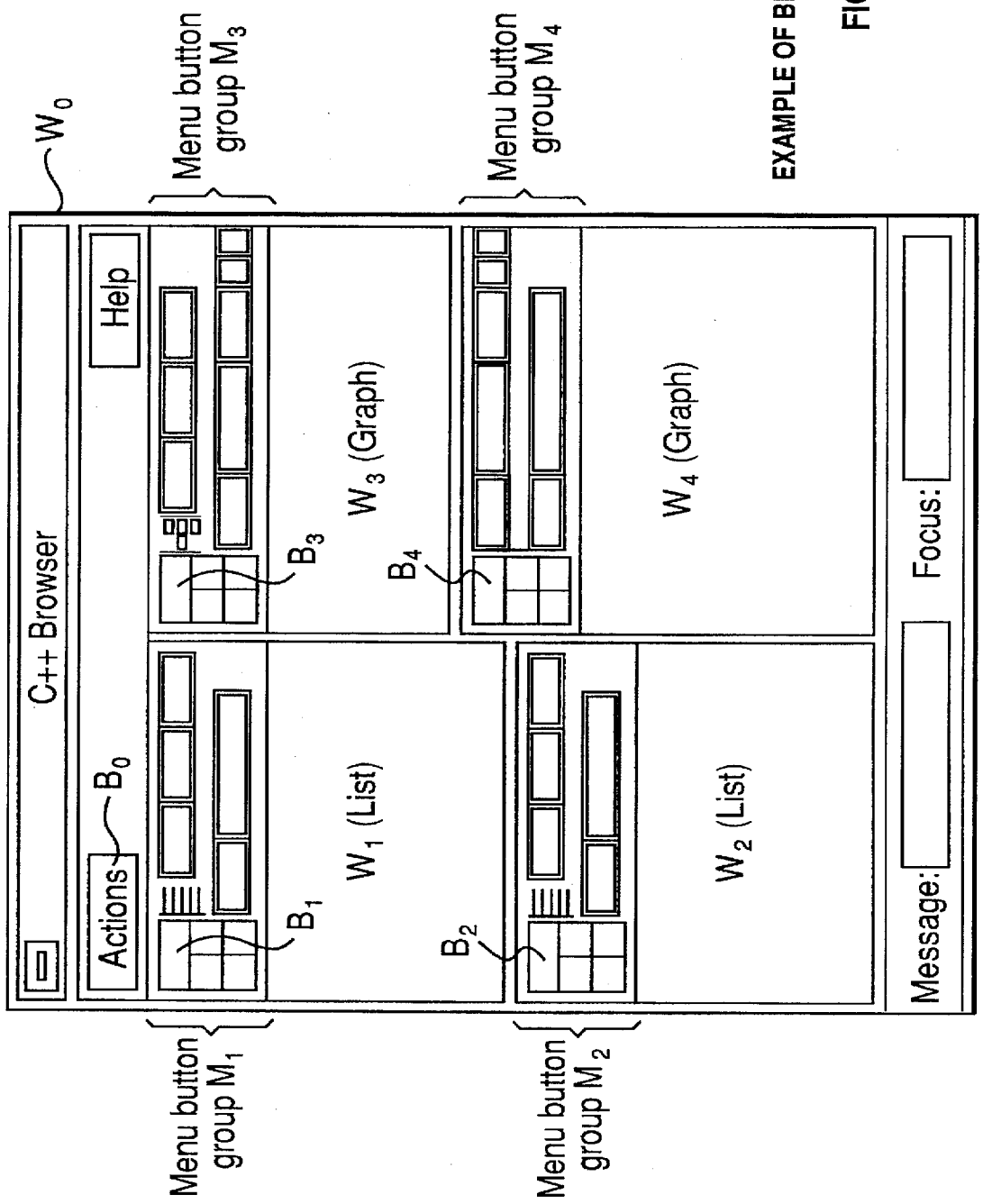
FIG. 1 is a view showing an example of a screen according to an embodiment of the present invention.

FIG. 1 shows a screen layout of the browser of the embodiment. One parent window W0 of the browser consists of four sub-windows W1–W4. Menu button groups M1–M4 to be used for specifying an operation with respect to the associated sub-window are provided in the top portions of the respective sub-windows W1–W4. An "Actions" button B0 is provided at the upper-left corner of the parent window W0. As later described in detail, types of sub-windows W1–W4 can be set using the button B0. The menu button groups M1–M4 of the sub-windows W1–W4 include "import" buttons B1–B4 (described later). In the state as shown in FIG. 1, the type of two left-side sub-windows W1 and W2 are for list information, the upper-right sub-window W3 for a graph, and the lower-right sub-window W4 for a text.

Figure 2:
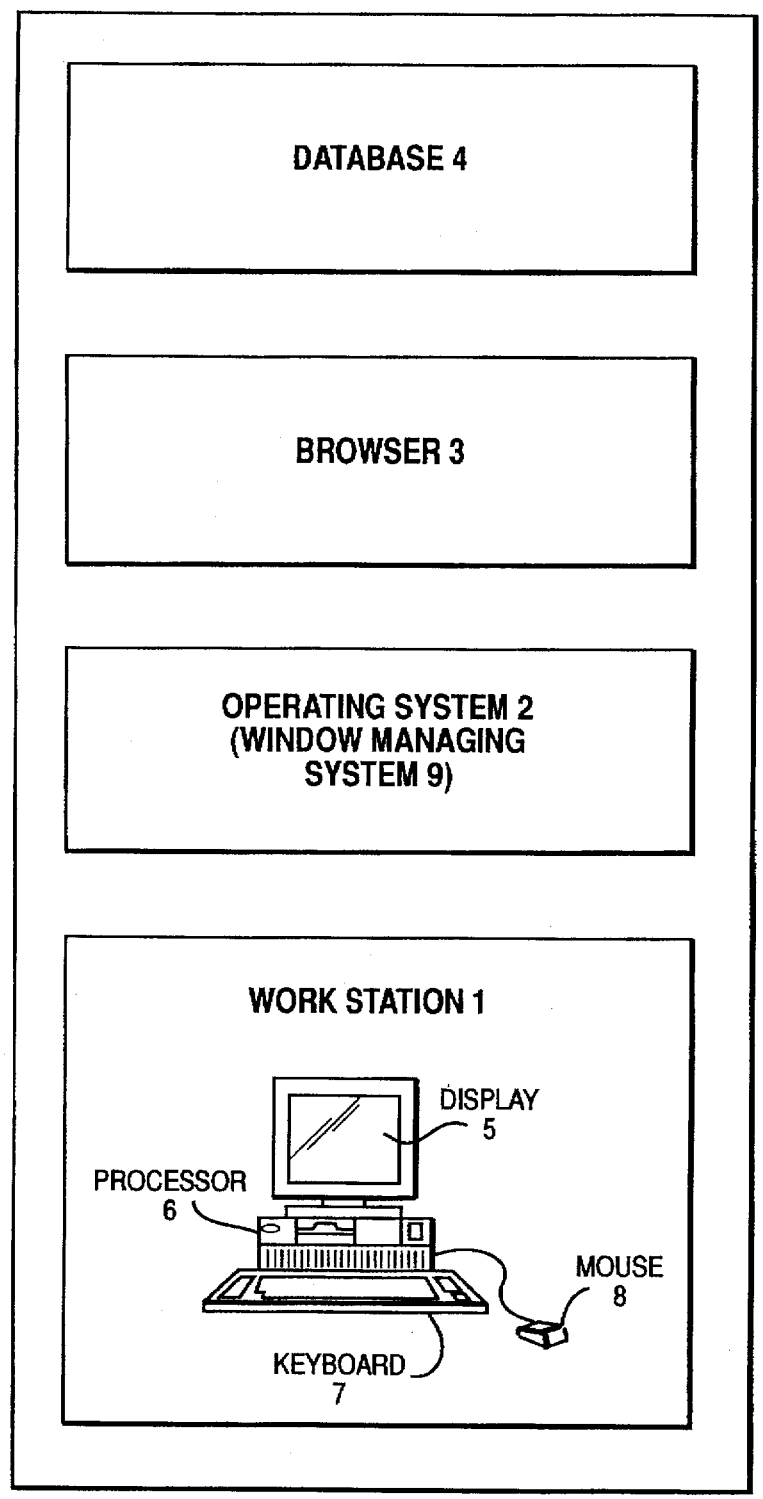
FIG. 2 is a view showing the entire configuration of the above-mentioned embodiment.

FIG. 2 shows the whole configuration of a system of this embodiment. In the figure, the system comprises a workstation 1, an operating system 2, a browser 3 and a database 4. The workstation 1 is, for example, an RS/6000 of International Business Machines Corporation (IBM), and includes a processor 6, a display 5, a keyboard 7, a mouse 8, etc. (RS/6000 is a trademark of IBM.) The operating system 2 is, for example, AIX (trademark of IBM), also of IBM, and includes a window managing system 9 for managing an interaction between a user and I/O devices such as the display 5, the keyboard 7 and the mouse 8. The window managing system 9 is, for example on the AIX system, the X Window system. The database 4 controls data displayed by the browser 3. The browser 3 displays information in the database 4 using the window managing system 9. Further, the browser 3 performs an input process such as menu selection in accordance with an event of the user that is sent from the window managing system 9.

Figure 3:
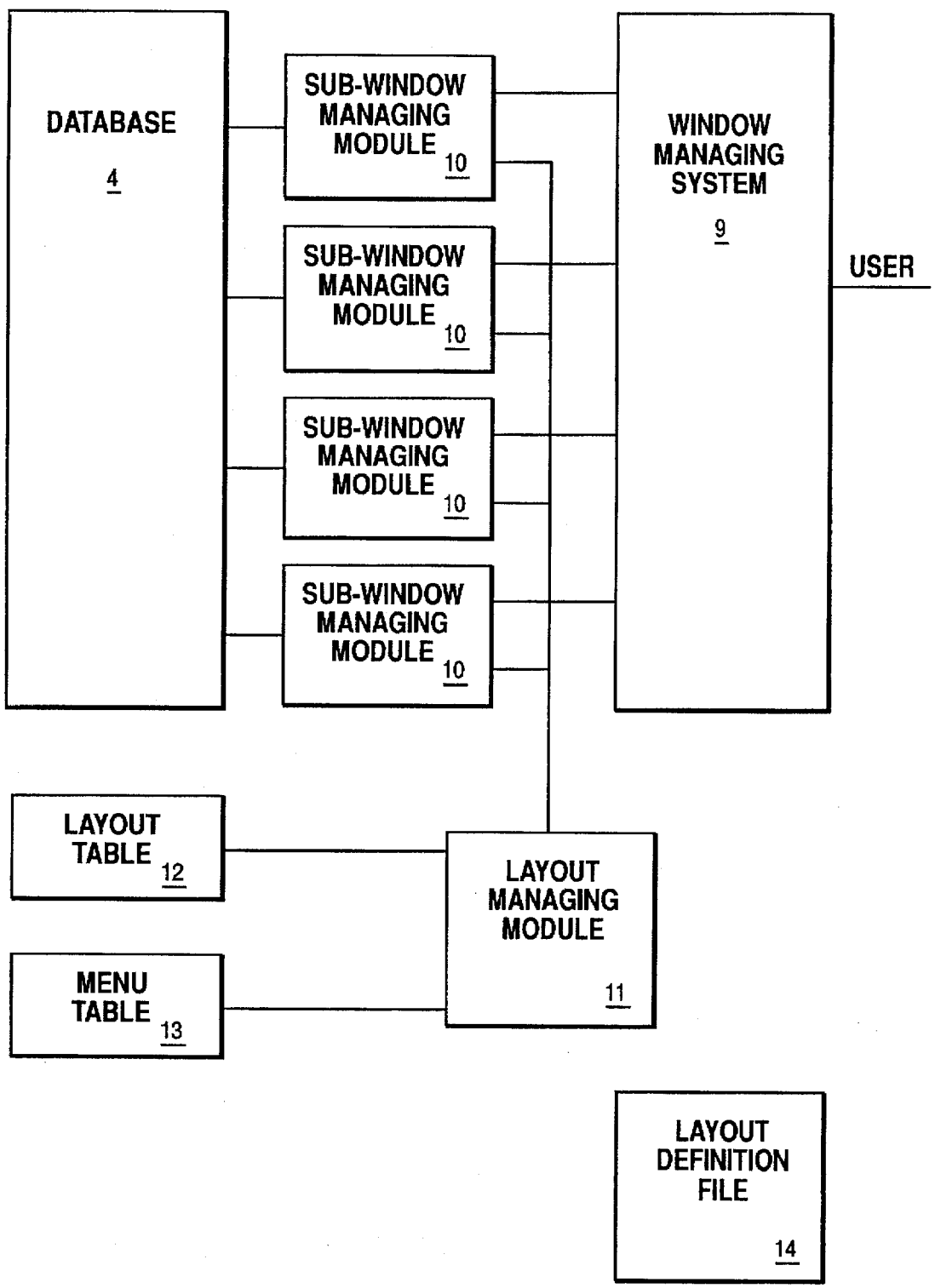
FIG. 3 is a view showing a configuration of the main part of the above-mentioned embodiment.

FIG. 3 shows in detail a configuration of the browser 3 of FIG. 2. The browser 3 includes sub-window managing modules 10 for implementing functions of the respective sub-windows, a layout managing module 11 for generating the sub-window managing modules 10 when necessary, a layout table 12 for storing the position, the type and the status of each sub-window, and a menu table 13 for storing the correspondence between a status and a menu for that status of each sub-window. In this example, four sub-window managing modules 10 are provided which correspond to the four sub-windows provided in one window of the browser 3. Each sub-window managing module 10 is linked to the window managing system 9 and the database 4, and performs a series of operations for receiving an input event of the user, inquiring the database 4, and displaying results on the screen using the window managing system 9.

FIG. 4 shows an example of the layout table 12. In this example, the position is one of upper-left, lower-left, upper-right or lower-right. In other words, it is assumed that four sub-windows are provided by dividing the window into four areas arranged up-down and left-right. The type of each sub-window can be selected from a list, graph, text, etc. The list arranges data such as names in one direction, and is suitable for displaying a list of information. In terms of the program browser, it is, for example, a list of function names or a list of variable names. The graph links nodes distributed in a two-dimensional or three-dimensional space by lines, and is suitable for displaying relational information between objects. In terms of the program browser, it is a representation of a calling relationship between functions or the like. The text represents characters in a two-dimensional plane, and is suitable for displaying characters themselves of a source file of a program or the like. The text sub-window is used as a text editor. If the type of sub-window is different, the manner of display, the suitable information, operations applicable to the sub-window or the like are also different. There may be various variations of possible selections for the four sub-windows such as two for the list and each one for the graph and the text, or all for the text, depending on the intended use and the preference of the user. Further, the most suitable way for positioning which type of sub-window at which location varies depending on how to use them.

Figure 6:
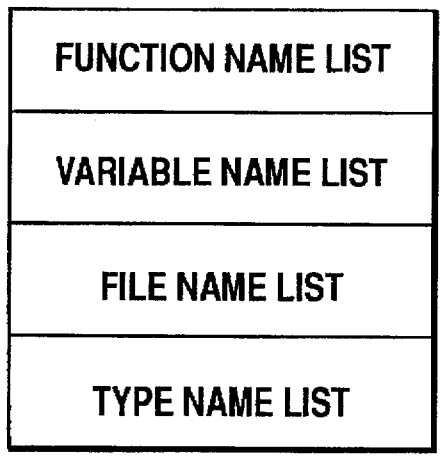
FIG. 6 is a view showing an example of a menu view at the time of initialization in the above mentioned embodiment.
Figure 7:
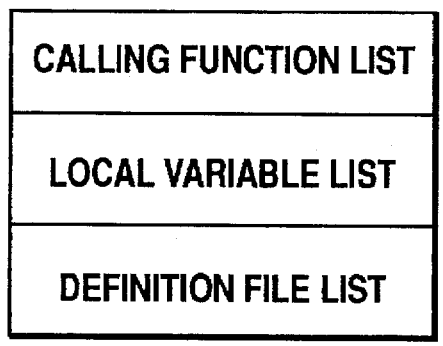
FIG. 7 is a view showing an example of a menu view at the time of specifying a specific function in the above-mentioned embodiment.

FIG. 5 shows an example of the menu table 13. The menu table 13 represents the relationships in which a given sub-window provides a given menu when in a given status. Examples of the possible status of each sub-window include an initial state and the specification of a specific function. The initial state means a state immediately after generation of the sub-window, and the specification of a specific function means that the sub-window has been designated to display information on a specific function. FIG. 6 shows an example of a menu for the initial state, and FIG. 7 shows an example of a menu for the specification of a specific function. When the item of the function name list is selected from the menu of FIG. 6, the list of function names is displayed in the sub-window. Similarly, when the item of the calling function list is selected from the menu of FIG. 7, the list of the calling functions is displayed in the sub-window. In some cases, it is effective to change, in the above manner, the menu of the same list-type sub-window in accordance with its status.

As shown in FIG. 4, one of the entries of the menu table 13 is stored in the layout table 12 as an entry showing the current status of the sub-window.

Figure 8:
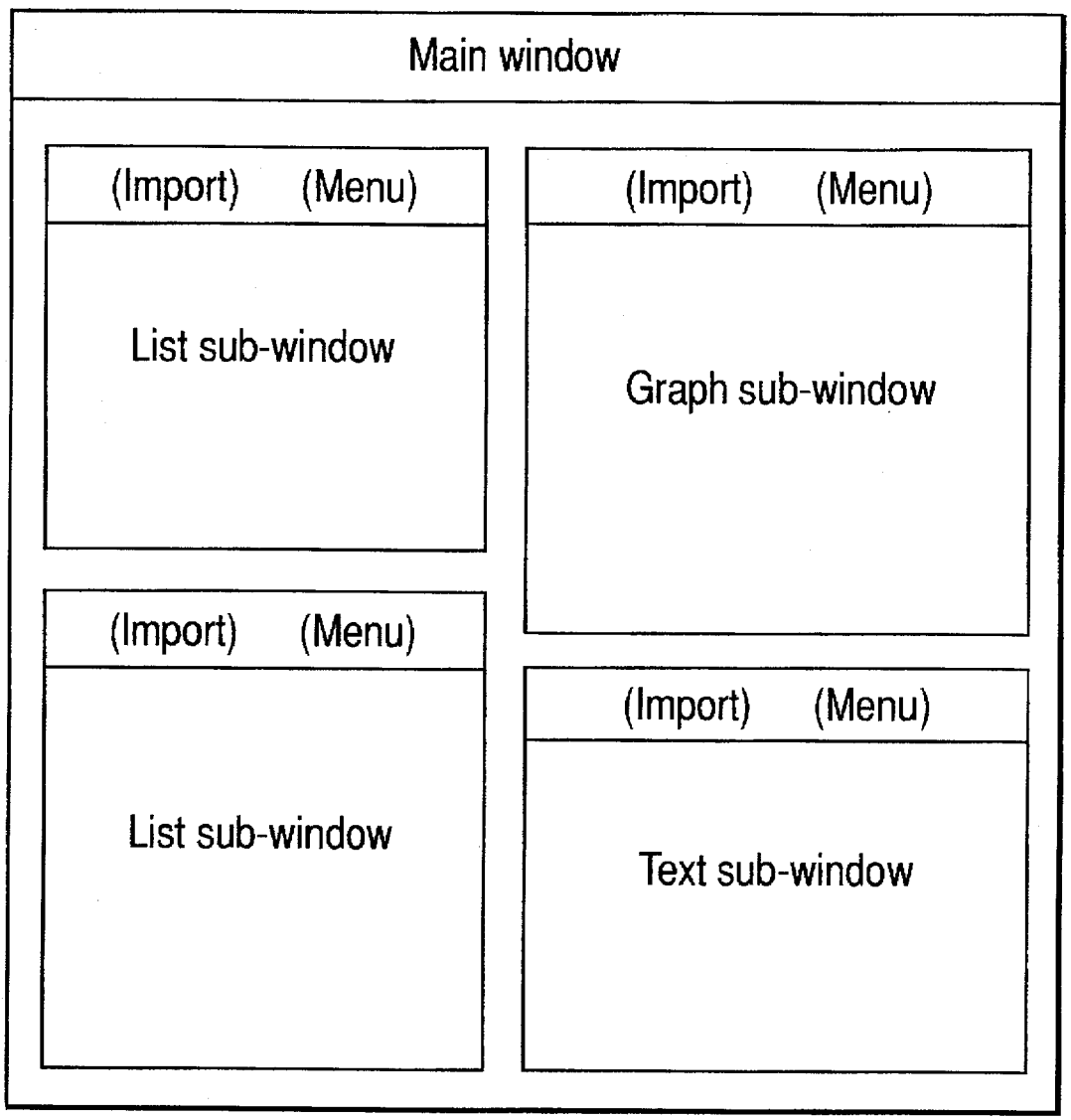
FIG. 8 is a view showing an example of a layout of a browser window in the above-mentioned embodiment.

Next, the operation of this embodiment is described below:

As shown in FIG. 1 in a specific manner, and in FIG. 8 in a simplified manner, the browser of the embodiment displays information of the database in a plurality of sub-windows. Further, the selection of a menu by the user with the mouse changes the information displayed in the sub-window.

Figure 10:
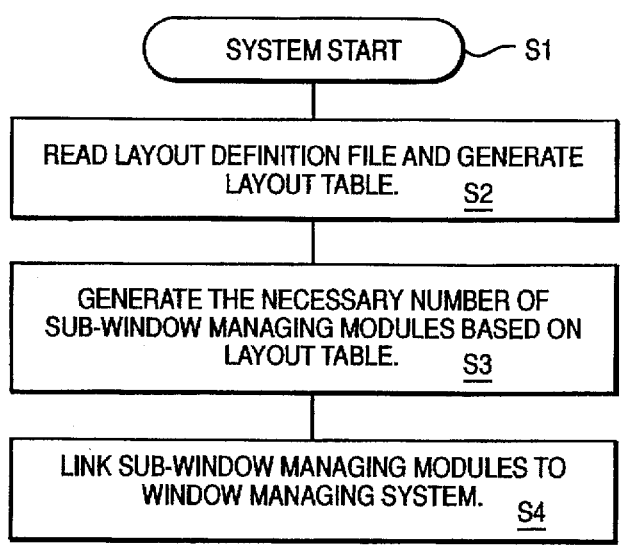
FIG. 10 is a flowchart showing the operation of the above-mentioned embodiment.

FIG. 10 shows the operation of the layout managing module 11 at the time of system start. Referring to FIG. 10, at the time of starting, the browser 3 reads the layout definition file 14 which includes statements relative to the layout, end writes that information into the layout table 12 (S1, S2). All the status columns of the sub-windows are left in the initial state. Then, based on the layout table 12, a necessary number of sub-window managing modules 10 is generated in accordance with the type (S3). The sub-window managing modules 10 thus generated are linked to the window managing system 9 for the operating system 2 (S4) to enable it to receive an input event of the user and to output a view. Based on the position information in the layout table 12, each sub-window managing module 10 requests the window managing system 9 of an actual display. The menu of the sub-window is generated and displayed by taking out the definition of the menu from the menu table 13.

An initial screen is generated in the following manner:
(1) The layout managing module 11 sends to the window managing system 9 a command for drawing the outer frame of the parent window.
(2) The layout managing module 11 sends to the window managing system 9 a command for dividing the parent window into four.
(3) The layout managing module 11 reads the contents of the layout table 12.
(4) The layout managing module 11 generates the sub-window managing modules 10 of the types that are in accordance with the contents of the layout table 12.
(5) In order to independently generate a sub-window, each sub-window managing module 10 sends to the window managing system 9 a command for generating a menu section of the sub-window in accordance with the description in the menu table 13.
(6) Each sub-window managing module 10 sends to the window managing system 9 a command for generating a window, buttons, etc. at desired positions in accordance with their type.

Figure 11:
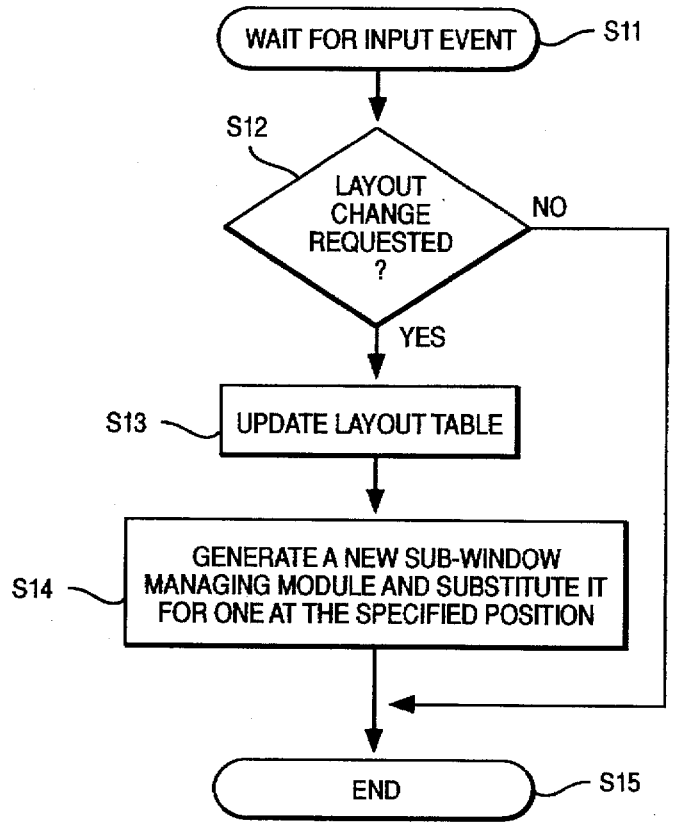
FIG. 11 is a flowchart showing the operation of the above-mentioned embodiment.

FIG. 11 shows an operation when a request for changing the layout is input by the user during operation of the browser system. The operation generates a new sub-window managing module 10 and links it to the window managing system 9 in almost the same manner as at the time of starting. One difference is that the existing module 10 is replaced. In FIG. 11, when the input event is a layout change request, the layout table 12 is altered (S11–S13). Then, in accordance with the layout table thus altered, a new sub-window managing module 10 is generated and substituted for the existing one at the specified position (S14). If there is no layout change request, the layout table 12 is not altered (S11, S12).

The layout change request can be made by clicking the "Actions" button B0 located at the upper-left corner of the parent window shown in FIG. 1 with the mouse 8. Upon clicking this button B0, a pull-down menu (not shown) is displayed to enable selection from various operation items. The layout change is finished when the user selects the layout change item from these operation items and specifies which sub-window and what type it should be.

Figure 9:
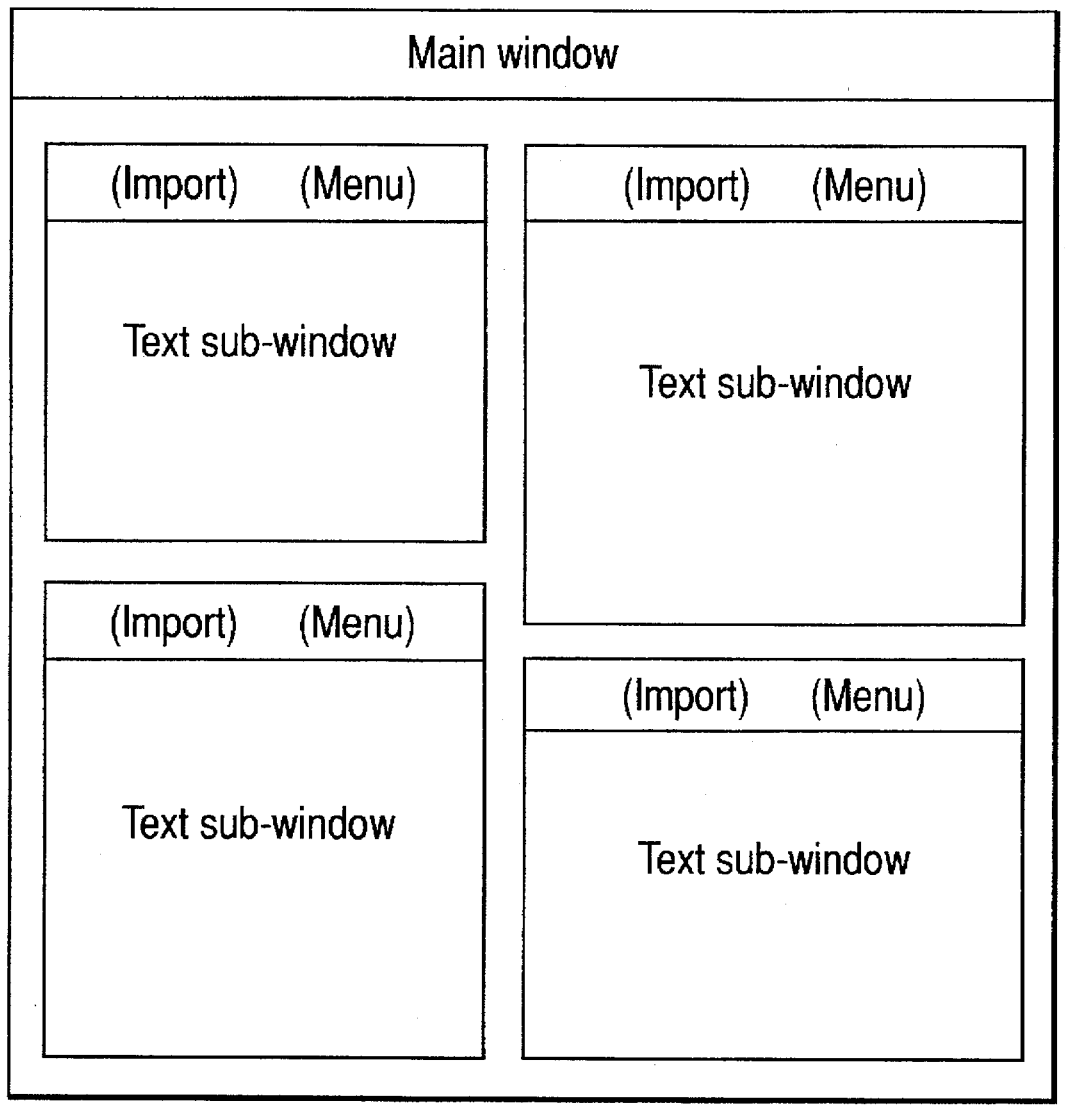
FIG. 9 is a view showing another example of a layout of a browser in the above-mentioned embodiment.

FIG. 8 shows a case where the types of the sub-windows are a list for the upper left one, a list for the lower left one, a graph for the upper right one, and a text for the lower right one. A case where the types of all sub-windows are text is shown in FIG. 9.

Figure 12:
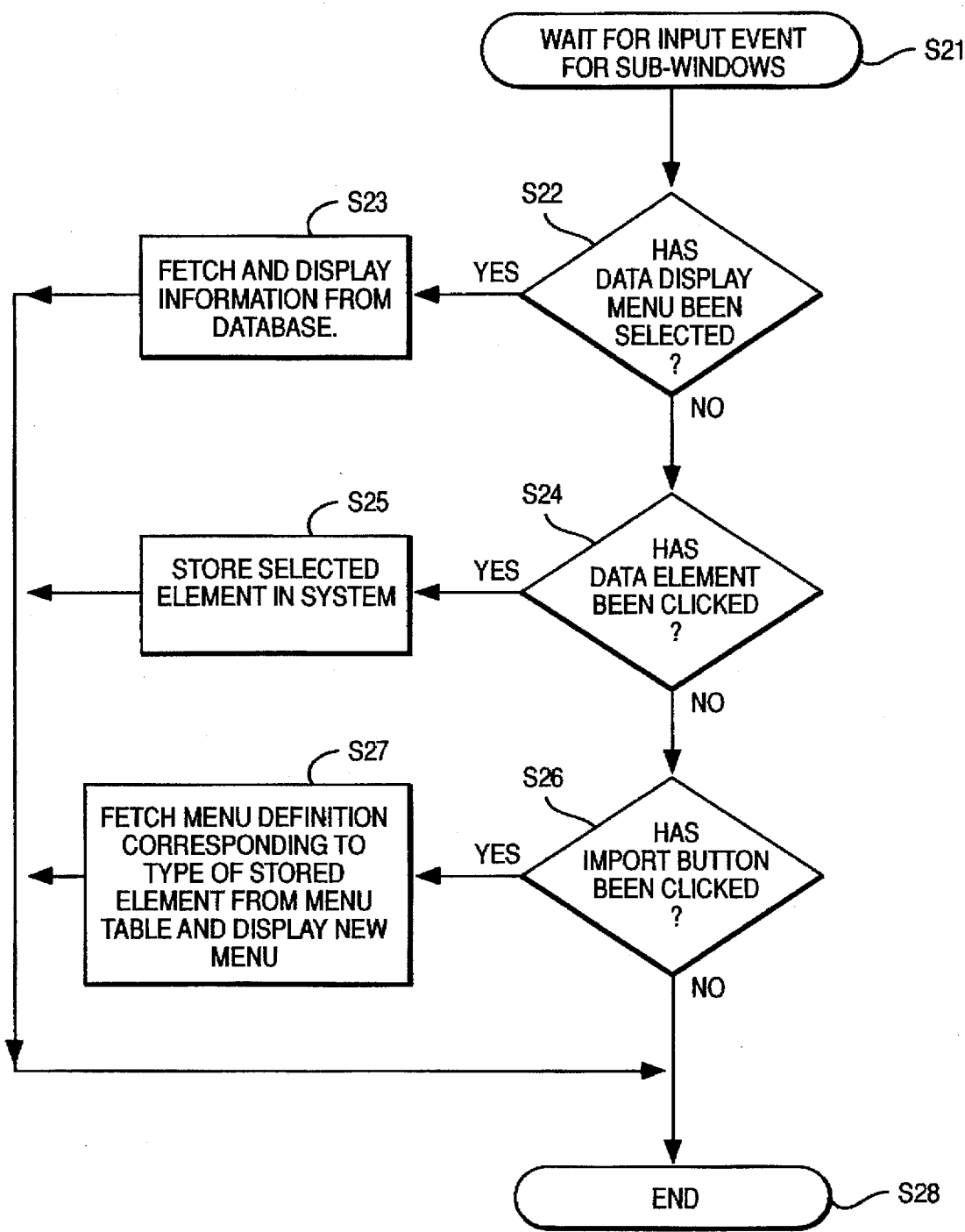
FIG. 12 is a flowchart showing the operation of the above-mentioned embodiment.

FIG. 12 shows an operation for automatically rewriting contents of the layout table 12, and for automatically changing a menu of a sub-window when the current status of the sub-window is changed. An explanation is made by also referring to the example of FIG. 8.

It is assumed in FIG. 8 that at first all the sub-windows are in the initial setting state and that the upper-left and lower-left sub-windows are of a list. At the moment, the menu of the upper left sub-window is the initial setting menu as shown in FIG. 6.

Under such state, if it is intended to first display a function name list in the upper left sub-window W1, to select a desired function from the displayed list, and to display the detailed information of the function in the lower left sub-window W2, the following operations are performed.

(1) Upon selection of the function name list from the menu in the upper-left sub-window W1, a list of all the functions in the database 4 is displayed in the upper-left window W1 (S21–S23).

(2) Then, when a function is selected from the function name list by clicking the mouse, the window managing system 9 sends a corresponding message to the sub-window managing module 10 of the upper-left sub-window W1. In response to this message, the sub-window managing module 10 stores in a global area an indicator, for example, a function name "f00" that indicates what the selected function is (S24, S25).

(3) When the import button B2 of the lower-left sub-window W2 is pressed (S26), the window managing system 9 sends a message indicating the pressing of the import button B2 to the sub-window managing module 10 of the lower-left sub-window W2.

In response, the sub-window managing module 10 searches for the type of the currently specified element that is stored in the global area, which is, in this example, the function name.

(4) The window managing module 10 of the lower-left sub-window W2 fetches a menu definition for the function from the menu table 13, generates a command according to that definition, and sends the command to the window managing system 9. In response to this command, the window managing system 9 displays a new menu in the lower-left sub-window W2 (S27). A pop-up menu or similar is also automatically changed in response to this substitution of the menu definition.

In this manner, the menu of the lower-left sub-window W2 is changed from the initial menu to the menu for specifying a specific function in accordance with the operation for importing the function in the lower-left sub-window W2. As a result, the menu selection can be optimized. Alternatively, the menu of the sub-windows other than the lower-left sub-window W2 can be changed automatically in a similar manner.

Although the embodiment of the source code browser of the language processor is described above, it is apparent that the invention can be broadly applied to an information processing system presenting a plurality of windows. Further, the invention is not limited to cases where a fixed number of windows are arranged so as not to overlap with each other, but is applicable to systems in which the window overlapping is permitted. Still further, it is apparent that the invention is not limited to cases where a plurality of windows are arranged in a parent window, but is applicable to cases where a plurality of windows are provided on a display screen.

As described in the foregoing, invention provides a layout table describing positions and types of a plurality of windows to be displayed on a display screen or in a parent window. At the time of initialization or when the layout table is changed, windows and associated window managing modules (sub-window managing modules) are generated or added in accordance with the contents of the layout table. The window managing module processes a user input event in accordance with its type and position, and displays appropriate information in the window in accordance with the user's instructions. The user can describe the contents of the layout table in an external file, or can specify layout information using a menu provided by the system when running the system. In this manner, the user can set the positions and types of windows as desired and, therefore, he can enjoy improvement in ease of operations.

Further, according to the invention, the above layout table is arranged to store information on the current status of each window, that is, information on the normal status or various statuses that depend on imported information. In addition to the layout table, a table (menu table) for correlating the state of each window with a menu to be prepared for that status is provided. When it is required to do so, for example, at the time of import, the system automatically changes the item for the current status in the layout table. When the item for the current status of the layout table is changed, the window managing module fetches menu information for the new status from the menu table, and changes over the menu of the window. In this manner, a necessary menu is selected and displayed during the normal status or at the time of displaying detailed information. As a result, the menu view can be simplified and the menu selecting operation becomes easier.

While the invention has been described with respective to particular embodiments above it be understood by those skill in the art that modifications may be made without departing from the skill and scope of the present invention. These embodiments are for purposes of example and illustration only and are not to be taken to limit the scope of the invention narrower than the scope of the appended claims.

We claim:

1. A window displaying apparatus comprising:
   means for displaying a first application specified graphical user interface for an application program including a plurality of windows on a display screen;
   means for storing information specifying the graphical user interface, the information including a window type for each of the windows, each window type displaying information in a different form;
   means for displaying in each of the windows, a corresponding portion of the graphical user interface as specified in the storing means;
   means responsive to user input for changing the application specified graphical user interface to a user specified graphical user interface during runtime of the application program including means for changing the window type of at least one window from an application specified window type to a user specified window type; and
   means for displaying the user specified graphical user interface including the at least one window according to the changed window type.

2. The window displaying apparatus of claim 1, wherein the information on the graphical interface includes information on a menu to be displayed in a first window.

3. The window displaying apparatus of claim 2, wherein the information on the menu to be displayed in the first window is determined in accordance with a current window type of the first window to be displayed.

4. The window displaying apparatus of claim 1 wherein the information specifying the graphical user interface is based on a window state for each of the windows, wherein the possible window states include an application specified initial state and a user specified import state for importing data from another window.

5. The window displaying apparatus of claim 1 wherein the windows are displayed in a fixed, nonoverlapping arrangement.

6. A window displaying method comprising the steps of:
   displaying a first application specified graphical user interface for an application program including a plurality of windows on a display screen;
   reading information specifying the graphical user interface, the information including a set of window types for the windows from a memory, each window type displaying information in a different form;

displaying in each of the windows, parts of the graphical user interface as specified in the information;

changing the application specified graphical user interface to a user specified graphical user interface in response to user input during runtime of the application, the changing step including changing the window type of at least one window from an application specified window type to a user specified window type; and displaying the user specified graphical user interface including the at least one window according to the changed window type.

7. The method of claim 6 which further comprises the step of displaying a menu in a first window in accordance with the window type for the first window, wherein the menu is changed if the window type of the first window is changed.

8. The method of claim 6 wherein the information specifying the graphical user interface is based on a window state for each of the windows, wherein the possible window states include an application specified initial state and a user specified import state for importing data from another window.

9. In a computer program product on a computer readable medium for displaying windows executable on a computer system, said program product comprising:

program code means for displaying a first application specified graphical user interface for an application program including a fixed plural number of windows on a display screen without overlapping and in a fixed arrangement;

program code means for reading information specifying the graphical user interface, the information including a window type for each of the windows from a memory, each window type displaying information in a different form;

program code means for displaying in each of said windows, parts of the graphical user interface based on the information read from the memory; and, program code means responsive to user input for changing the application specified graphical user interface to a user specified graphical user interface during runtime of the application program including means for changing the window type of at least one window from an application specified window type to a user specified window type; and program code means for displaying the user specified graphical user interface including at least one window according to the changed window type.

10. The product of claim 9 which further comprise program code means for displaying a menu in a first window in accordance with a window type for the first window, wherein the menu is changed if the window type of the first window is changed.

11. The product of claim 9 wherein the information specifying the graphical user interface is based on a window state for each of the windows, wherein the possible window states include an application specified initial state and a user specified import state for importing data from another window.

12. An information processing apparatus comprising:

processing information storing means for storing information to be processed;

a processor for processing the information to be processed that is stored in the storing means;

means for displaying a fixed plural number of windows on a display screen in a fixed arrangement;

user interface specifying information storing means for storing information specifying a first application specified graphical user interface for an application program which specifies a window type for each of the windows, each window type displaying information in a different form;

means for displaying, for each of the windows, parts of the graphical user interface in an associated window in accordance with the user interface specified with respect to the associated window;

means for controlling, for each of the windows, an interaction with a user via the parts of the associated window; and means responsive to user input for changing the application specified graphical user interface to a user specified graphical user interface during runtime of the application program including means for changing the window type of at least one window from an application specified window type to a user specified window type.

13. An information displaying apparatus comprising:

means for displaying a first application specified graphical user interface for an application program including a plurality of windows on a display screen;

means for displaying a set of information elements in the windows according to a window type and window state for each of the windows, each window type displaying information in a different form, each window state initially in an application specified state;

means for selecting one information element among the set of displayed information elements in a first window;

means for changing the application specified state to a user specified import state of a second window in response to user input, the import state designating the second window to display detailed information on the selected information element in the first window; and means for displaying, in the second window, detailed information on the information element that has been selected in one window.

14. The information displaying apparatus of claim 13, wherein when the second window for displaying the detailed information on the selected information element is specified, a menu displayed in the second window is changed from a first menu for normal display to a second menu for detailed information display.

15. A method for changing a graphical user interface from an initial application specified state to a user specified state, comprising the steps of:

displaying the graphical user interface in the application specified state each of a plurality of windows in an initial application specified state, a first window in the plurality including a set of selectable elements;

selecting an element in the set of selectable elements;

changing the initial application specified state of a second window to a user specified state for importing data about the selected element; and displaying the graphical user interface in the user specified import state, wherein detailed data concerning the selected element is displayed in the second window.

16. The method as recited in claim 15 wherein the detailed data and the set of selectable elements are menus.

17. The method as recited in claim 16 wherein the menus are displayed in the first and second windows according to a respective window type of the first and second windows.

18. The method as recited in claim 16, wherein a first menu is displayed in the second window in its initial state and the menu of detailed data is displayed in the second window in its user specified import state.

19. The method as recited in claim 15 wherein the elements in the set of selectable elements are of different types and the detailed data is displayed in the second window according to a type of the selected element.

20. A computer program in a computer readable medium for changing a graphical user interface from an initial application specified state to a user specified state, comprising:

means for displaying each of a plurality of windows in an initial application specified state and a list of selectable elements in a first window;

means for selecting an element in the list of selectable elements;

means for changing the initial application specified state of a second window to a user specified import state; and means for displaying the second window in the import state so that detailed data concerning the selected element is displayed in the second window.

* * * * *